(12) United States Patent
Taguchi

(10) Patent No.: US 12,182,190 B2
(45) Date of Patent: Dec. 31, 2024

(54) INFORMATION PROCESSING APPARATUS, INFORMATION PROCESSING SYSTEM, DATA PROCESSING METHOD, AND NON-TRANSITORY RECORDING MEDIUM

(71) Applicant: Daigo Taguchi, Kanagawa (JP)

(72) Inventor: Daigo Taguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/901,875

(22) Filed: Sep. 2, 2022

(65) Prior Publication Data

US 2023/0095325 A1 Mar. 30, 2023

(30) Foreign Application Priority Data

Sep. 29, 2021 (JP) .................................. 2021-159190

(51) Int. Cl.
*G06F 17/00* (2019.01)
*G06F 16/35* (2019.01)
*G06F 16/38* (2019.01)

(52) U.S. Cl.
CPC ............ *G06F 16/353* (2019.01); *G06F 16/38* (2019.01)

(58) Field of Classification Search
CPC ........ G06F 16/353; G06F 16/38; G06F 16/93; G06F 21/64; G06Q 10/06316; G06Q 10/10; G06Q 50/18
See application file for complete search history.

(56) References Cited

U.S. PATENT DOCUMENTS

| | | | |
|---|---|---|---|
| 6,754,699 B2 * | 6/2004 | Swildens | H04L 41/5064 709/217 |
| 8,065,171 B2 * | 11/2011 | Nguyen | G06Q 20/204 705/40 |
| 8,949,184 B2 * | 2/2015 | Sokolan | G06F 16/2358 707/634 |
| 10,360,197 B2 * | 7/2019 | Topness | G06Q 10/10 |
| 2009/0006408 A1 * | 1/2009 | Fujikawa | G06F 16/93 |

(Continued)

FOREIGN PATENT DOCUMENTS

| | | |
|---|---|---|
| JP | 2008-257708 | 10/2008 |
| JP | 2008-259211 | 10/2008 |
| JP | 2021-064063 | 4/2021 |

OTHER PUBLICATIONS

Jongbeen Han et al., A decentralized document management system using blockchain and secret sharing. In Proceedings of the 36th Annual ACM Symposium on Applied Computing. Association for Computing Machinery, 305-308. <https://doi.org/10.1145/3412841.3442077>, Mar. 2021.*

(Continued)

*Primary Examiner* — Greta L Robinson
(74) *Attorney, Agent, or Firm* — XSENSUS LLP

(57) ABSTRACT

An information processing apparatus includes circuitry to receive electronic data from a terminal; request, via a network, another information processing apparatus to perform processing on the electronic data; and transmit, to the another information processing apparatus, a request of change to the requested processing based on an input received from the terminal. The circuitry executes processing related to the electronic data in accordance with a response from the another information processing apparatus to the request of change.

17 Claims, 14 Drawing Sheets

(56) References Cited

U.S. PATENT DOCUMENTS

| | | | | |
|---|---|---|---|---|
| 2014/0278814 | A1* | 9/2014 | Stallman | G06Q 10/0637 |
| | | | | 705/7.36 |
| 2015/0046369 | A1* | 2/2015 | Taylor | G06Q 10/10 |
| | | | | 705/342 |
| 2016/0267562 | A1* | 9/2016 | Follis | G06Q 10/083 |
| 2020/0050780 | A1* | 2/2020 | Uhr | G06F 21/64 |
| 2020/0092436 | A1* | 3/2020 | Lagumbay | G06Q 50/18 |
| 2021/0107768 | A1 | 4/2021 | Nishida | |

OTHER PUBLICATIONS

Qing Zhang et al., FutureText: A Blockchain-based Contract Signing Prototype with Security and Convenience. In Proceedings of the 3rd ACM International Symposium on Blockchain and Secure Critical Infrastructure. Asso. for Computing Machinery, 77-83, <https://doi.org/10.1145/3457337.3457844>, May (Year: 2021).*

Saeed Mirzamohammadi et al., Tabellion: secure legal contracts on mobile devices. In Proceedings of the 18th International Conference on Mobile Systems, Applications, and Services, Asso. for Computing Machinery, 220-230, <https://doi.org/10.1145/3386901.3389027>, Jun. 2020.*

Svetislav Simić, Marko Marković, and Stevan Gostojić. 2021. Smart Contract and Blockchain Based Contract Management System. In 7th Conference on the Engineering of Computer Based Systems. Association for Computing Machinery, Article 6, 1-8. <https://doi.org/10.1145/345996>, May 2021.*

* cited by examiner

FIG. 5

| DOCUMENT ID | FILE PATH |
|---|---|
| 001 | C:¥Data¥001.pdf |
| 002 | C:¥Data¥002.pdf |
| 003 | C:¥Data¥003.pdf |
| ... | ... |

FIG. 6

| DOCUMENT ID | FILE NAME | DOCUMENT ID IN ELECTRONIC CONTRACT SYSTEM | DOCUMENT TYPE | CONTRACT START DATE | CONTRACT END DATE | STATUS |
|---|---|---|---|---|---|---|
| 001 | 001.pdf | 00A | BASIC CONTRACT | 2021/08/01 | 2022/07/31 | VALID |
| 002 | 002.pdf | 00B | BUSINESS CONTRACT | 2021/09/01 | 2022/08/31 | REJECTED |
| 003 | 003.pdf | 00C | MEMORANDUM | 2021/10/10 | 2023/10/31 | WITHDRAWAL REQUESTED |
| ... | ... | ... | ... | ... | ... | ... |

FIG. 7

| WORKFLOW ID | START TRIGGER | FLOW 1 | FLOW 2 |
|---|---|---|---|
| 1 | UPDATE OF DOCUMENT | EXAMINATION BY MR. A | APPROVAL BY MR. B |
| 2 | STORING OF NEW DOCUMENT | FILE UPLOAD TO ELECTRONIC CONTRACT SYSTEM | – |
| 3 | STATUS CHANGE TO WITHDRAWAL REQUESTED | WITHDRAWAL REQUEST TO ELECTRONIC CONTRACT SYSTEM | – |

FIG. 8

| DOCUMENT ID | FILE PATH |
|---|---|
| 00A | C:¥Data¥00A.pdf |
| 00B | C:¥Data¥00B.pdf |
| 00C | C:¥Data¥00C.pdf |
| 00D | C:¥Data¥00D.pdf |
| ... | ... |

FIG. 9

| DOCUMENT ID | STATUS |
|---|---|
| 00A | DRAFT |
| 00B | BEING CHECKED |
| 00C | REJECTED |
| 00D | AGREED |
| ... | ... |

FIG. 10

| STATUS IN ELECTRONIC CONTRACT SYSTEM | RESPONSE TO DOCUMENT MANAGEMENT SYSTEM | PROCESSING IN ELECTRONIC CONTRACT SYSTEM |
|---|---|---|
| DRAFT | DELETED | DELETE DOCUMENT |
| BEING CHECKED | WITHDRAWN | CHANGE STATUS TO REJECTED |
| AGREED | WITHDRAWAL NOT FEASIBLE | NO |
| REJECTED | WITHDRAWN | NO |

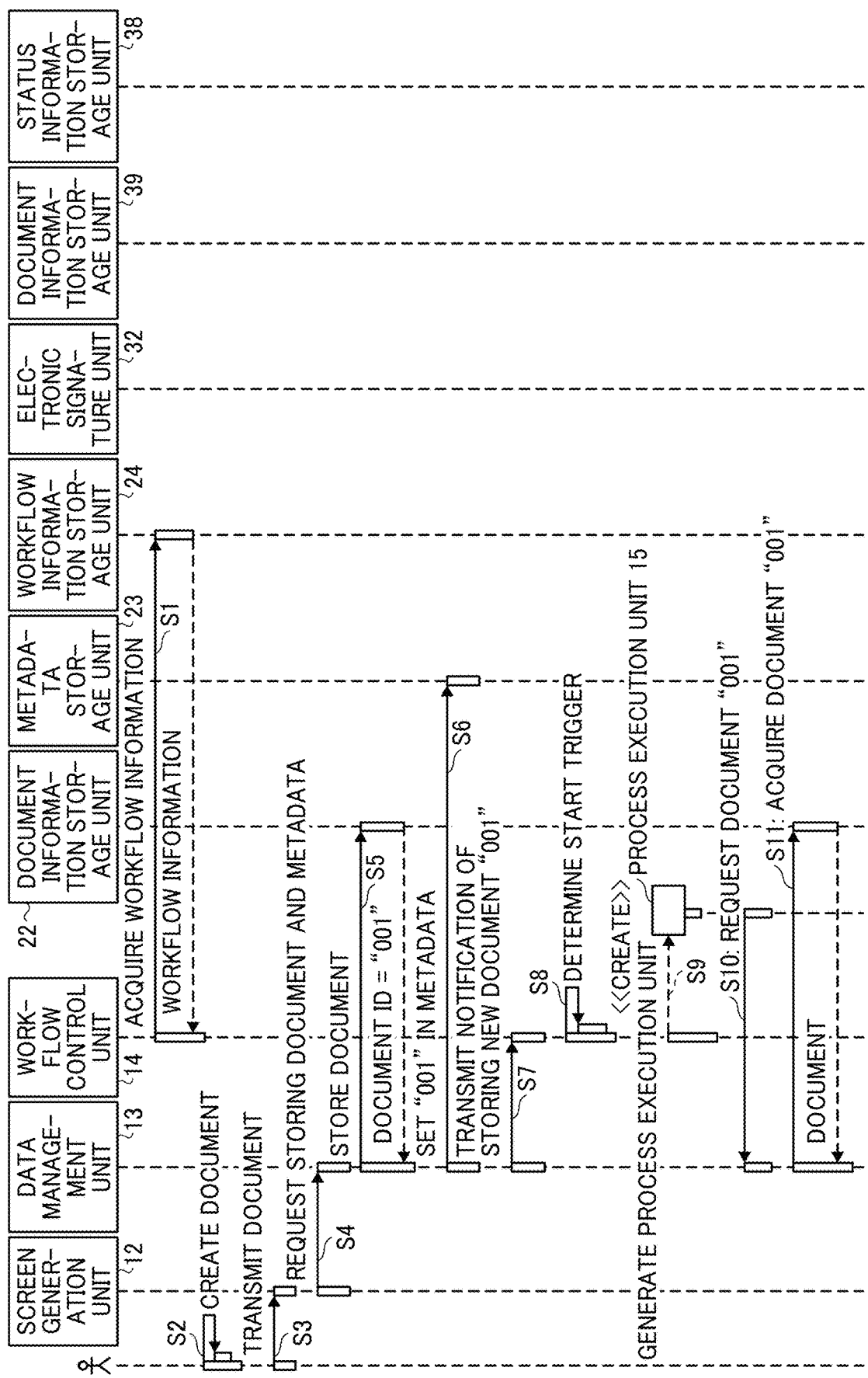

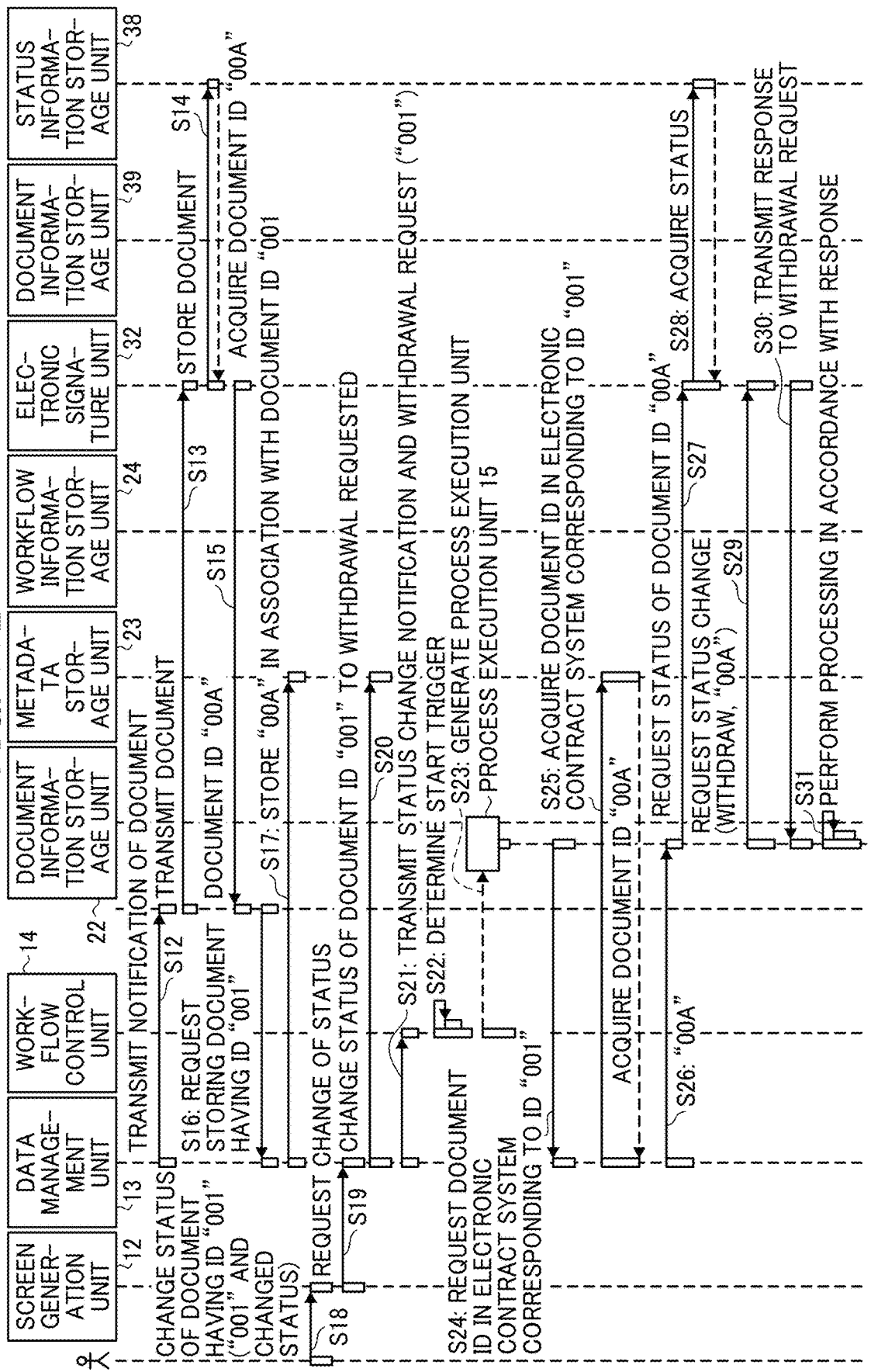

FIG. 12

| DOCUMENT ID | CONTRACT SYSTEM DOCUMENT ID | DOCUMENT TYPE | CONTRACT START DATE | CONTRACT END DATE | STATUS |
|---|---|---|---|---|---|
| 001 | — | BASIC CONTRACT | 2021/08/01 | 2022/07/31 | VALID |

FIG. 13

| DOCUMENT ID | CONTRACT SYSTEM DOCUMENT ID | DOCUMENT TYPE | CONTRACT START DATE | CONTRACT END DATE | STATUS |
|---|---|---|---|---|---|
| 001 | 00A | BASIC CONTRACT | 2021/08/01 | 2022/07/31 | VALID |

FIG. 14

| DOCUMENT ID | CONTRACT SYSTEM DOCUMENT ID | DOCUMENT TYPE | CONTRACT START DATE | CONTRACT END DATE | STATUS |
|---|---|---|---|---|---|
| 001 | 00A | BASIC CONTRACT | 2021/08/01 | 2022/07/31 | WITHDRAWAL REQUESTED |

FIG. 15A

FILE UPLOAD — 250

FILE [                    ] 251    [BROWSE] 252

[SAVE] 253

FIG. 15B

METADATA SETTING — 260

DOCUMENT TYPE        [        ] 261
CONTRACT START DATE  [        ] 262
CONTRACT END DATE    [        ] 263

[CONFIRM] 264

FIG. 16

SEARCH — 210

DOCUMENT TYPE        [        ] 211
CONTRACT START DATE  [        ] 212
CONTRACT END DATE    [        ] 213

[SEARCH] 214

FIG. 17

DOCUMENT LIST — 220

| | FILE NAME (221) | DOCUMENT TYPE (222) | CONTRACT START DATE (223) | CONTRACT END DATE (224) | |
|---|---|---|---|---|---|
| 1 | 001.pdf | BASIC CONTRACT | 2021/08/01 | 2022/07/31 | STATUS CHANGE (226) |
| 2 | CONTRACT WITH COMPANY X | BASIC CONTRACT | 2021/09/01 | 2022/08/31 | STATUS CHANGE |
| 3 | YY CONTRACT | BASIC CONTRACT | 2021/10/10 | 2023/10/31 | STATUS CHANGE |

225 — OPEN

FIG. 18

METADATA SETTING — 230

- DOCUMENT TYPE — 231
- CONTRACT START DATE — 232
- CONTRACT END DATE — 233
- STATUS — 234

235 — CONFIRM

FIG. 19

| RESPONSE FROM ELECTRONIC CONTRACT SYSTEM | PROCESSING IN DOCUMENT MANAGEMENT SYSTEM |
|---|---|
| DELETED | DELETE DOCUMENT |
| WITHDRAWN | CHANGE STATUS IN METADATA TO "REJECTED" |
| WITHDRAWAL NOT FEASIBLE | CHANGE STATUS IN METADATA TO "VALID" |

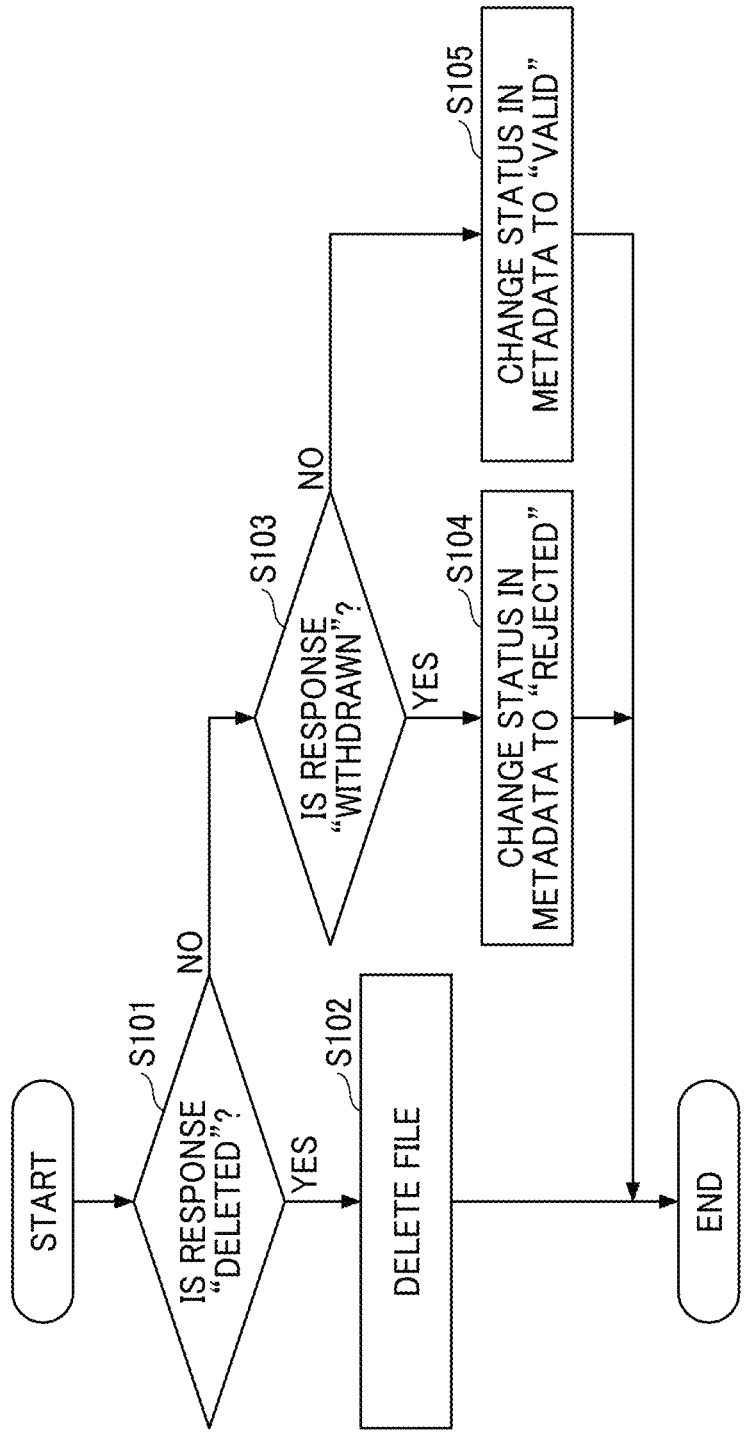

FIG. 21

DOCUMENT LIST

VALID DOCUMENT — 241

| | FILE NAME | DOCUMENT TYPE | CONTRACT START DATE | CONTRACT END DATE | |
|---|---|---|---|---|---|
| 1 | 001.pdf | BASIC CONTRACT | 2021/08/01 | 2022/07/31 | STATUS CHANGE |
| 2 | CONTRACT WITH COMPANY X | BASIC CONTRACT | 2021/09/01 | 2022/08/31 | STATUS CHANGE |

INVALID DOCUMENT — 242

| | FILE NAME | DOCUMENT TYPE | CONTRACT START DATE | CONTRACT END DATE |
|---|---|---|---|---|
| 3 | YY CONTRACT | BASIC CONTRACT | 2021/10/10 | 2023/10/31 |

240

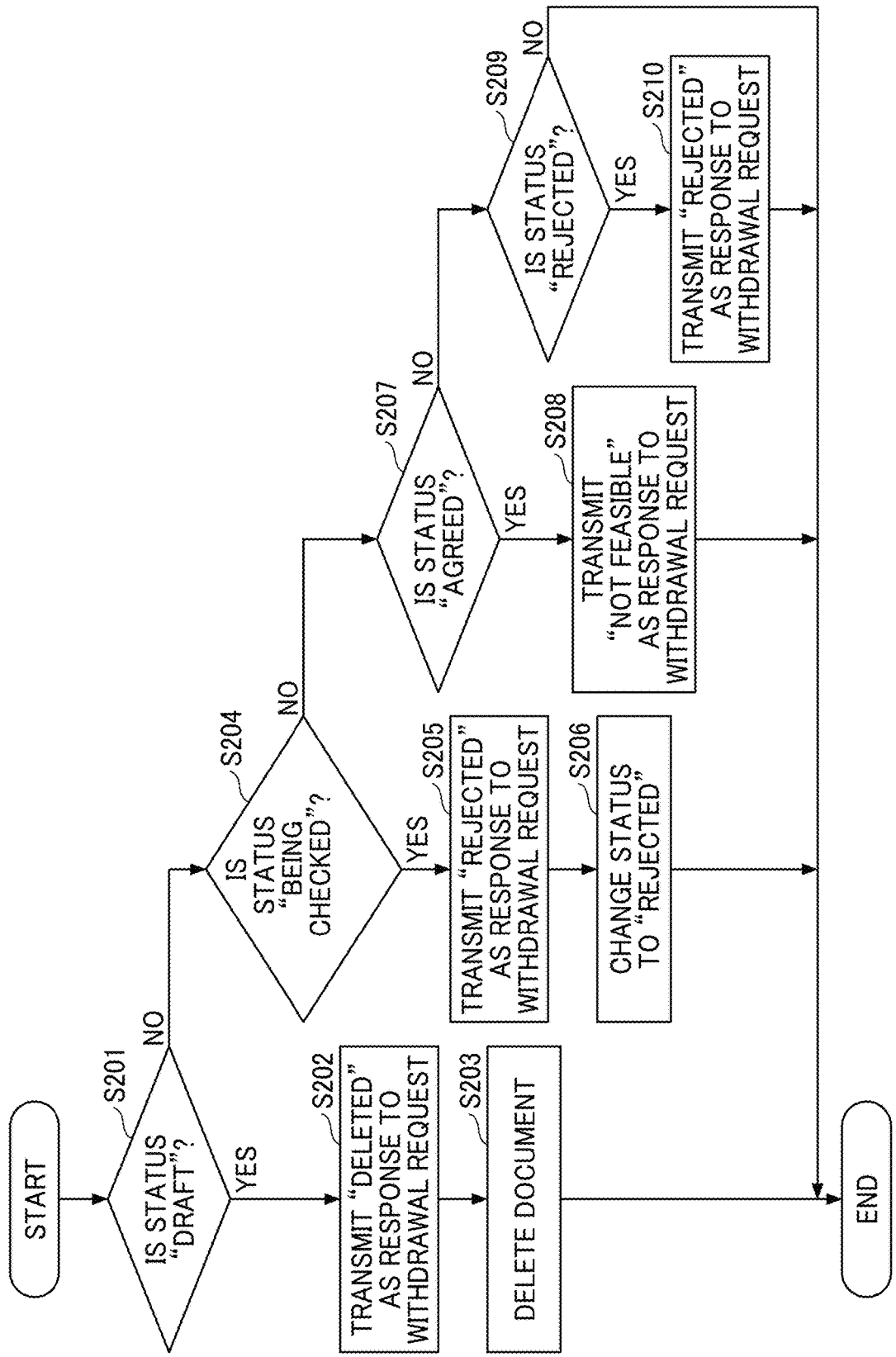

INFORMATION PROCESSING APPARATUS, INFORMATION PROCESSING SYSTEM, DATA PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-159190, filed on Sep. 29, 2021, in the Japan Patent Office, the entire disclosure of which is hereby incorporated by reference herein.

BACKGROUND

Technical Field

The present disclosure relates to an information processing apparatus, an information processing system, a data processing method, and a non-transitory recording medium.

Related Art

There is a method of assigning identification information to electronic data and managing the electronic data. There is also known a processing method in which a first system that stores electronic data transmits the electronic data to a second system and controls the second system to process the data.

There is a technology for registering an electronic document in a server with reference to identification information.

SUMMARY

According to an embodiment, an information processing apparatus includes circuitry to receive electronic data from a terminal; request, via a network, another information processing apparatus to perform processing on the electronic data; and transmit, to the another information processing apparatus, a request of change to the requested processing based on an input received from the terminal. The circuitry executes processing related to the electronic data in accordance with a response from the another information processing apparatus to the request of change.

According to another embodiment, the information processing system includes the information processing apparatus described above and another information processing apparatus. The another information processing apparatus executes another processing related to the electronic data in accordance with the status of the electronic data set by the another information processing apparatus in response to the request of change.

In another embodiment, a data processing method performed by an information processing apparatus includes receiving electronic data from a terminal; requesting, via a network, another information processing apparatus to perform processing on the electronic data; and transmitting, to the another information processing apparatus, a request of change to the requested processing based on an input received from the terminal. The method further includes executing processing related to the electronic data in accordance with a response from the another information processing apparatus to the request of change.

According to another embodiment, a non-transitory recording medium stores a plurality of program codes which, when executed by one or more processors, causes the processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of document information stored in a document information storage unit according to one embodiment:

FIG. 6 illustrates an example of metadata stored in a metadata storage unit according to one embodiment;

FIG. 7 illustrates an example of workflow information stored in a workflow information storage unit according to one embodiment:

FIG. 8 illustrates an example of document information stored in a document information storage unit the electronic contract system according to one embodiment;

FIG. 9 is a diagram illustrating an example of status information stored in a status information storage unit of the electronic contract system according to one embodiment;

FIG. 10 illustrates an example of status change correspondence information stored in a status change correspondence storage unit according to one embodiment;

FIG. 11A is a sequence diagram illustrating an example of a procedure in which the document management system reflects a status change to the electronic contract system, according to one embodiment:

FIG. 11B is another sequence diagram illustrating an example of a procedure in which the document management system reflects a status change to the electronic contract system, according to one embodiment;

FIG. 12 is a diagram illustrating an example of metadata after a document identifier (ID) is set;

FIG. 13 is a diagram illustrating an example of metadata after a document ID in the electronic contract system is stored;

FIG. 14 is a diagram illustrating an example of metadata after a document status is changed;

FIG. 15A is a diagrams illustrating an example of a document registration screen displayed by the terminal according to one embodiment;

FIG. 15B is a diagram illustrating an example of a metadata setting screen displayed by the terminal apparatus according to one embodiment;

FIG. 16 is a diagram illustrating an example of a search screen displayed by the terminal according to one embodiment:

FIG. 17 is a diagram illustrating an example of a document display screen displayed by the terminal according to one embodiment;

FIG. 18 is a diagram illustrating an example of a status setting screen displayed by the terminal according to one embodiment;

FIG. 19 illustrates an example of a list of processes performed by the document management system in response to a withdrawal request result, according to one embodiment:

FIG. 20 is a flowchart illustrating a process performed by the document management system on a document or status in response to a response (withdrawal request result) from the electronic contract system according to one embodiment;

FIG. 21 is a diagram illustrating an example of a document display screen on the terminal, on which documents are classified by status, and FIG. 22 is a flowchart illustrating a process performed by the electronic contract system in response to the withdrawal request, according to one embodiment.

Figure 1:
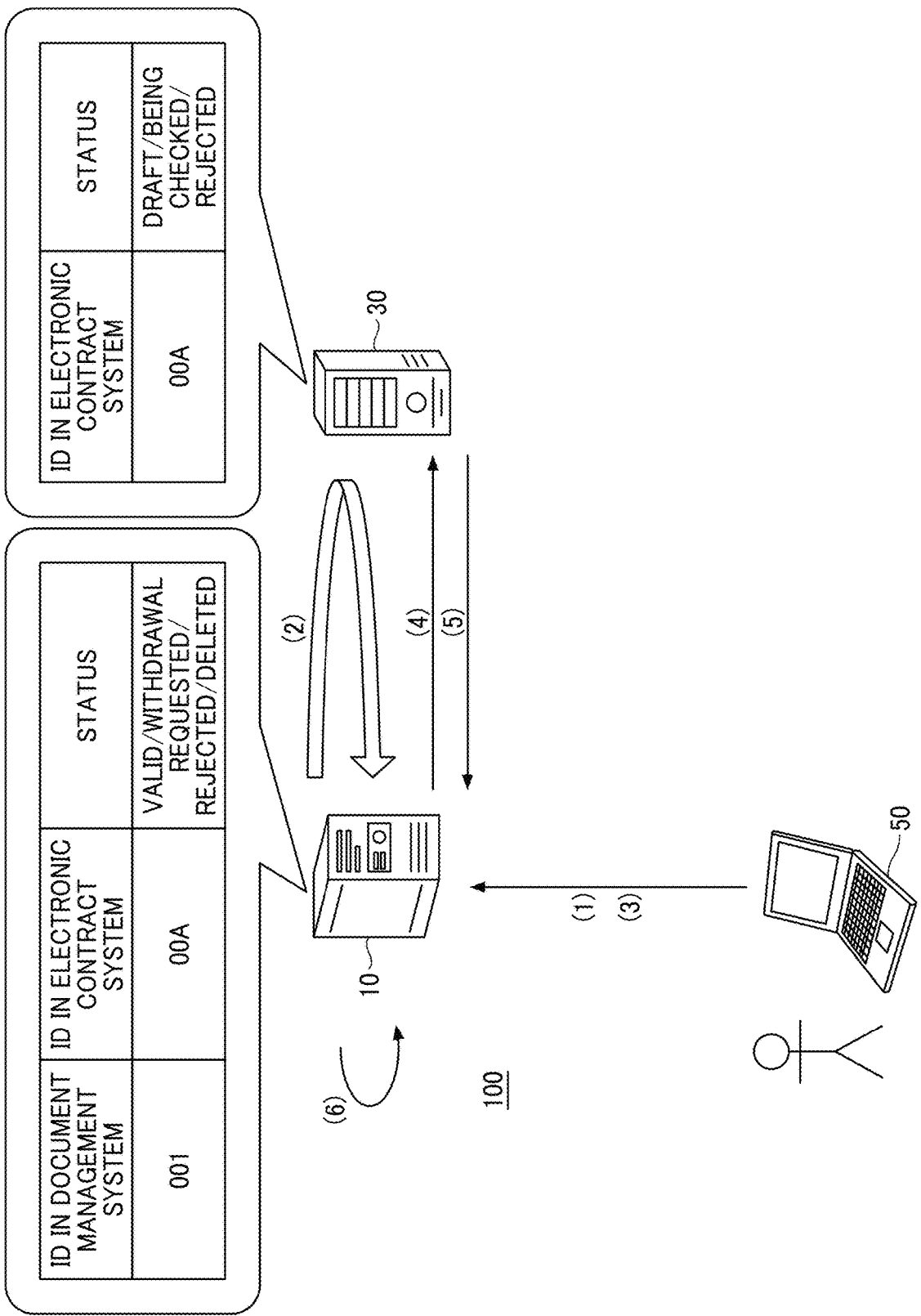
FIG. 1 is a diagram illustrating an outline of a method of controlling electronic data performed by a document management system according to one embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Descriptions are given of an information processing system and an information processing method, performed by the information processing system, as example embodiments of the present disclosure.

Outline of Operation

FIG. 1 is a diagram illustrating an outline of an electronic data management method performed by a document management system 10. The document management system 10 stores and processes a variety of documents. In some cases, the document management system 10 executes workflow including a series of processing on a document and requests an electronic contract system 30 to perform a part of the workflow. The electronic contract system 30 performs communication regarding contracts with another party (a business partner or a customer) of a contract and gives an electronic signature.

In such a system configuration, the document management system 10 of the present embodiment stores a document before processed by the electronic contract system 30 and a document after processed by the electronic contract system 30 in association with each other. This association enables a user to request the document management system 10 to withdraw the process of the document by the electronic contract system 30. In a case where the document management system 10 (first system) receives a request from a user to change processing to be performed on electronic data by the electronic contract system 30 (second system), processing to be performed by the first system differs depending on the status of the electronic data set by the second system. In view of this, the document management system 10 executes processing relating to the document in accordance with a response from the electronic contract system 30. An overview of this operation is described.

(1) A user operates a terminal 50 to create a document, which is, for example, a contract, and uploads the document from the terminal 50 to the document management system 10 (an example of a first system). The document management system 10 stores the document (contract) and assigns the document with identification information (ID) "001," which may be referred to as the "management-system document ID."

(2) When a predetermined condition for starting a workflow is satisfied, the document management system 10 executes the workflow. In the workflow, the document management system 10 transmits the document to the electronic contract system 30 (an example of a second system) and acquires an ID "00A" given to the document by the electronic contract system 30 as a return value. The document ID given by the electronic contract system 30 may be referred to as the "contract-system document ID." The document management system 10 generates metadata in which the management-system document ID "001" and the contract-system document ID "00A" are associated with each other.

(3) The user requests the document management system 10 to withdraw the process of the document having the ID "001" by the electronic contract system 30 (an example of processing change).

(4) In response to the withdrawal request of the processing, the document management system 10 changes the status of the document to "withdrawal requested." The withdrawal request refers to a request for withdrawal of the process by the electronic contract system 30. That is, the document management system 10 enables the user to change the status of the document therein so as to request the electronic contract system 30 to change the process on the document. When the change of the status is the condition for starting the workflow, the document management system 10 executes the workflow. In the workflow, the document management system 10 refers to the metadata, converts the ID "001" to "00A", and requests the electronic contract system 30 to withdraw the process of the document "00A."

(5) The electronic contract system 30 returns a response corresponding to the status of the document identified by the contract-system document ID "00A" to the document management system 10. The response is determined based on the status of the document in the electronic contract system 30.

(6) The document management system 10 executes processing corresponding to the response on the document identified by "001." In other words, the document management system 10 executes processing corresponding to the status of the document identified by the document ID "00A" used in the electronic contract system 30. For example, the document management system 10 may delete a document or change the status of the document.

As described above, the document management system 10 stores association between the document ID assigned by the document management system 10 and the document ID assigned by the electronic contract system 30, so as to reflect, to the electronic contract system 30, the processing (status change) of the document requested by the user in the document management system 10. In addition, the document management system 10 performs the processing related to the document in accordance with the status of the document in the electronic contract system 30 (in accordance with the response from the electronic contract system 30). Accordingly, the document management system 10 can process the document in conformity with the progress of the process on the document by the electronic contract system 30.

Terms

"Electronic data" is data used for computer processing and is "electromagnetic record" stored in an electromagnetic recording medium. In the present embodiment, the term "document" refers to "electronic data." A document does not necessarily include characters. The term "document" refers to any document having computer-readable data. The electronic data may be image data such as a moving image or a still image.

The term "processing" or "process" represents information processing and refers to calculation, classification, collation, and other processing performed by a computer on information represented by numbers, characters, physical quantities, and the like. The electronic data is not necessarily changed by the second system.

The workflow refers to performing a predetermined series of processing on data by a system or a series of processing.

The change request of the processing refers to changing once requested processing for some reason, such as, suspension, temporarily stop, and withdrawal of the processing; and change of the processing content. In the present embodiment, the withdrawal request will be described as an example, but change request of the processing is not limited thereto.

The response from the second system is information indicating at least one of how the request from the document management system 10 has been processed and processing to be performed by the document management system 10.

The status of the document (electronic data) is information associated with the document in the electronic contract system 30. The status may be, for example, progress of processing or a result (success or failure) of the processing.

The processing relating to the electronic data may be any processing relating to at least one of the electronic data and the metadata. For example, processing relating to electronic data refers to deletion, modification, transmission of electronic data, deletion, modification, transmission of metadata, and the like.

System Configuration

Figure 2:
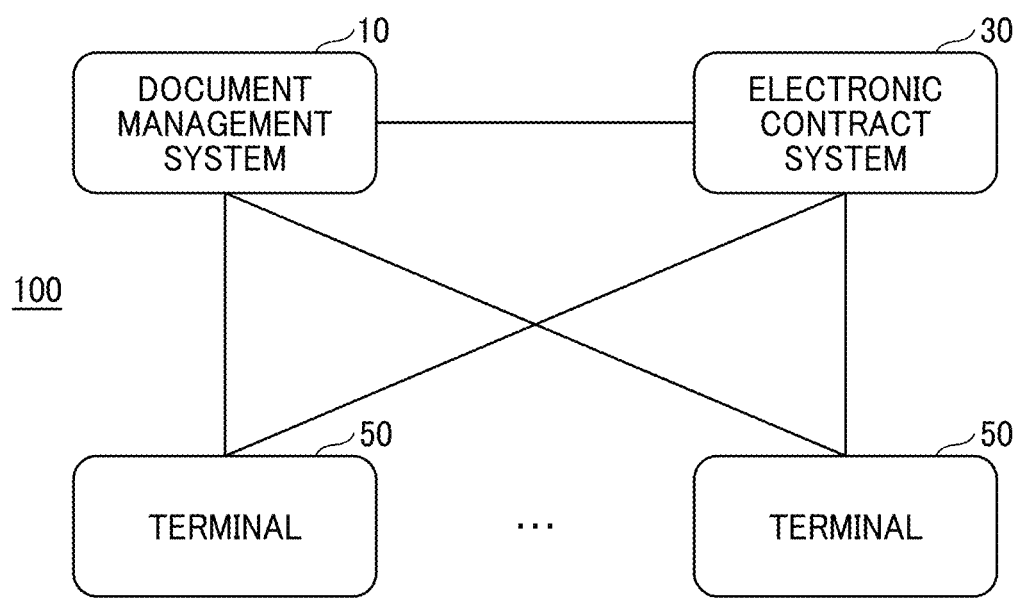
FIG. 2 is a schematic block diagram illustrating a configuration of an information processing system according to one embodiment.

A configuration of an information processing system 100 is described with reference to FIG. 2. FIG. 2 is a schematic block illustrating an example of the configuration of the information processing system 100.

The information processing system 100 includes at least the document management system 10.

The information processing system 100 may further include the electronic contract system 30. The document management system 10 and the electronic contract system 30 are connected via a network to communicate with each other. It is not essential that the document management system 10 and the electronic contract system 30 are constantly connected to each other. Further, the document management system 10 receives connection from the terminal 50. It is not essential that the document management system 10 and the terminal 50 are constantly connected to each other. Further, the electronic contract system 30 receives connection from the terminal 50. It is not essential that the electronic contract system 30 and the terminal 50 are constantly connected to each other.

The document management system 10 includes one or more information processing apparatuses. The document management system 10 provides a service for managing documents. The document management system 10 adds metadata to a document to enable efficient retrieval of the document using the metadata. In addition, the document management system 10 has a workflow function to provide a service of processing a document before or after starting management of the document. The metadata is data about certain data and is additional data about the certain data, accompanying the certain data Details are to be described later.

In the workflow function, processing may be performed by the second system (the electronic contract system 30 in FIG. 2). Conventionally, a document management system does not store the identification information of documents processed by other systems. In the present embodiment, as described with reference to FIG. 1, the document management system 10 stores the document ID used by the document management system 10 and the document ID used by the electronic contract system 30 in association with each other.

The document management system 10 may be implemented by cloud computing or may be implemented by a single information processing apparatus. The term "cloud computing" refers to the availability of resources on a network without identifying specific hardware resources. The document management system 10 may reside on the Internet or may be on-premises.

The electronic contract system 30 includes one or more information processing apparatuses. The electronic contract system 30 performs a process related to an electronic contract. Although there is no fixed definition thereof, the electronic contract system 30 is a system that concludes a contract by affixing an electronic signature or a time stamp to electronic data on the Internet instead of adding a seal to a paper contract. The electronic data is, for example, a contract in portable document format (PDF) format). In addition to concluding a contract, the electronic contract system 30 stores the concluded contract document, retrieves the contract, and performs cooperation with other systems. The electronic contract system 30 may have a workflow function to perform approval or request of approval.

As an example, an electronic signature is created as follows. Mr. A who wants to sign a document creates a hash value of the document using a hash function and encrypts the hash value using a private key. Mr. A affixes an electronic signature to the document and stores the document. Mr. B wants to know whether the document has been falsified and decrypts the electronic signature using the public key of Mr. A, obtains the hash value of the document, and compares the documents. When the two documents match, it is verified that the document has been created by the owner of the private key corresponding to the public key and has not been falsified by anyone other than the owner of the private key. Further, Mr. B checks whether the public key is valid by certificate verification. The certificate verification is inquiring of a certificate authority whether a signature of the certificate authority included in the public key is valid.

The electronic contract system 30 is an example of the second system used by the document management system 10 in the workflow. The second system may be one of the following systems.

Time stamp system: A time stamp is time certification information for certifying, in a third party manner, the existence of electronic data at a specific point of time and maintains evidentially without being falsified thereafter. The electronic certificate ensures that the document has not been falsified and also ensures the existence of electronic data at a specific point of time.

Noise removal system: A noise removal system is a system that removes noise from documents. Noise refers to unnecessary information other than necessary information such as a signature.

Watermarking system: A watermarking system is a system that gives documents a digital watermark. Digital watermarking refers to a technology for embedding related information in data such as an image, a moving image, and a sound in a form unperceivable by humans. Embedded information can be detected by using dedicated software or the like.

The electronic contract system 30 may be implemented by cloud computing or may be implemented by a single information processing apparatus. The electronic contract system 30 may reside on the Internet or may be on-premises.

The terminal 50 is a general-purpose computer that communicates with the document management system 10 and the electronic contract system 30. In the terminal 50, a web browser operates to display various screen images based on the screen information received from the document management system 10 or the electronic contract system 30. The user requests the document management system 10 to, for example, register a document, execute a workflow, and retrieve a document. In addition, the user can request the electronic contract system 30 to, for example, search and browse a document to which an electronic signature is attached.

The terminal 50 is, for example, a personal computer (PC), a smartphone, a tablet terminal, or a personal digital assistant (PDA) and may be any device on which a web browser operates. In the terminal 50, not only a web browser but also an application dedicated to the document management system 10 or the electronic contract system 30 may operate.

Further, the terminal 50 may be an electronic device such as a multifunction peripheral/product/printer (MFP) or an electronic whiteboard. For example, by transmitting image data (document) scanned by an MFP to the document management system 10, the MFP substitutes for the terminal 50. In addition, the terminal 50 may be a video conference terminal, a digital signage, or a projector. In the case of an electronic whiteboard, the terminal 50 transmits hand drafted data to the document management system 10. In the case of a video conference terminal, the terminal 50 transmits audio data to the document management system 10.

Hardware Configuration

Document Management System, Electronic Contract System, and Terminal

Figure 3:
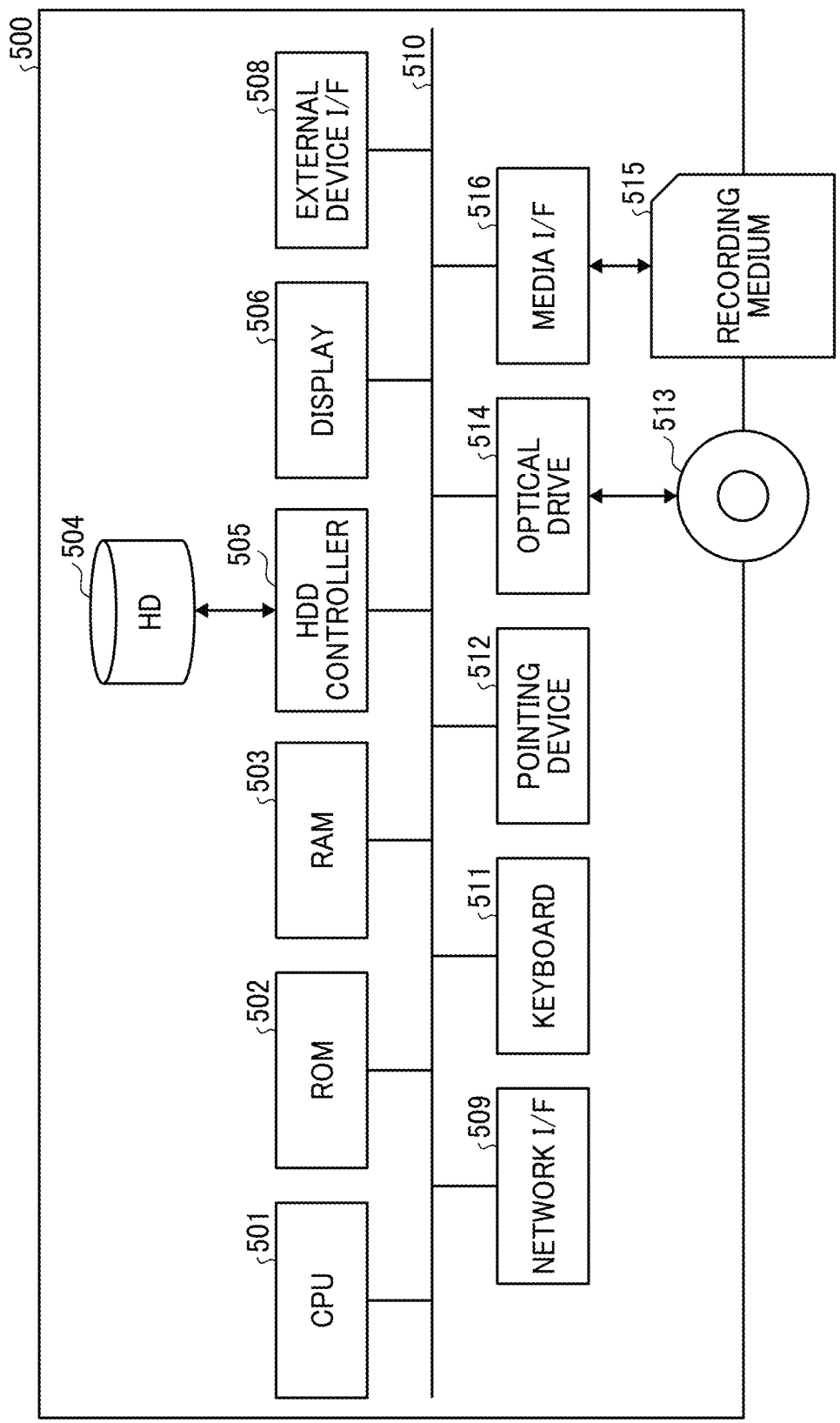
FIG. 3 is a block diagram illustrating an example of a hardware configuration of a computer.

Each of the document management system 10, the electronic contract system 30, and the terminal 50 is implemented by, for example, a computer 500 having a hardware configuration illustrated in FIG. 3. FIG. 3 is a block diagram illustrating an example of the hardware configuration of the computer 500. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a bus line 510, a keyboard 511, a pointing device 512, an optical drive 514, and a media I/F 516.

The CPU 501 controls entire operation of the computer 500. The ROM 502 stores programs, such as an initial program loader (IPL), for driving the CPU 501. The RAM 503 is used as a work area for the CPU 501. The HD 504 is a storage area that stores various data such as programs. The HDD controller 505 controls reading and writing of various data from and to the HD 504 under control of the CPU 501. The display 506 displays various information such as a cursor, a menu, a window, characters, and images. The external device I/F 508 is an interface for connecting to various external devices. Examples of the external devices in this case include a universal serial bus (USB) memory and an image forming apparatus. The network I/F 509 is an interface for performing data communication using a communication network. The bus line 510 is, for example, an address bus or a data bus for electrically connecting the components such as the CPU 501 illustrated in FIG. 3 with each other.

The keyboard 511 is a kind of input device including a plurality of keys for inputting a character, a numerical value, various instructions, and the like. The pointing device 512 is an example of an input device that allows a user to select or execute various instructions, select an item for processing, or move a cursor being displayed. The optical drive 514 controls reading or writing of various data with from or to an optical recording medium 513, which is an example of a removable recording medium. The optical recording medium 513 is, for example, a compact disc (CD), digital versatile disk (DVD), or a BLU-RAY. The media I/F 516 controls reading and writing (storing) of data from and to a recording medium 515 such as a flash memory.

Figure 4:
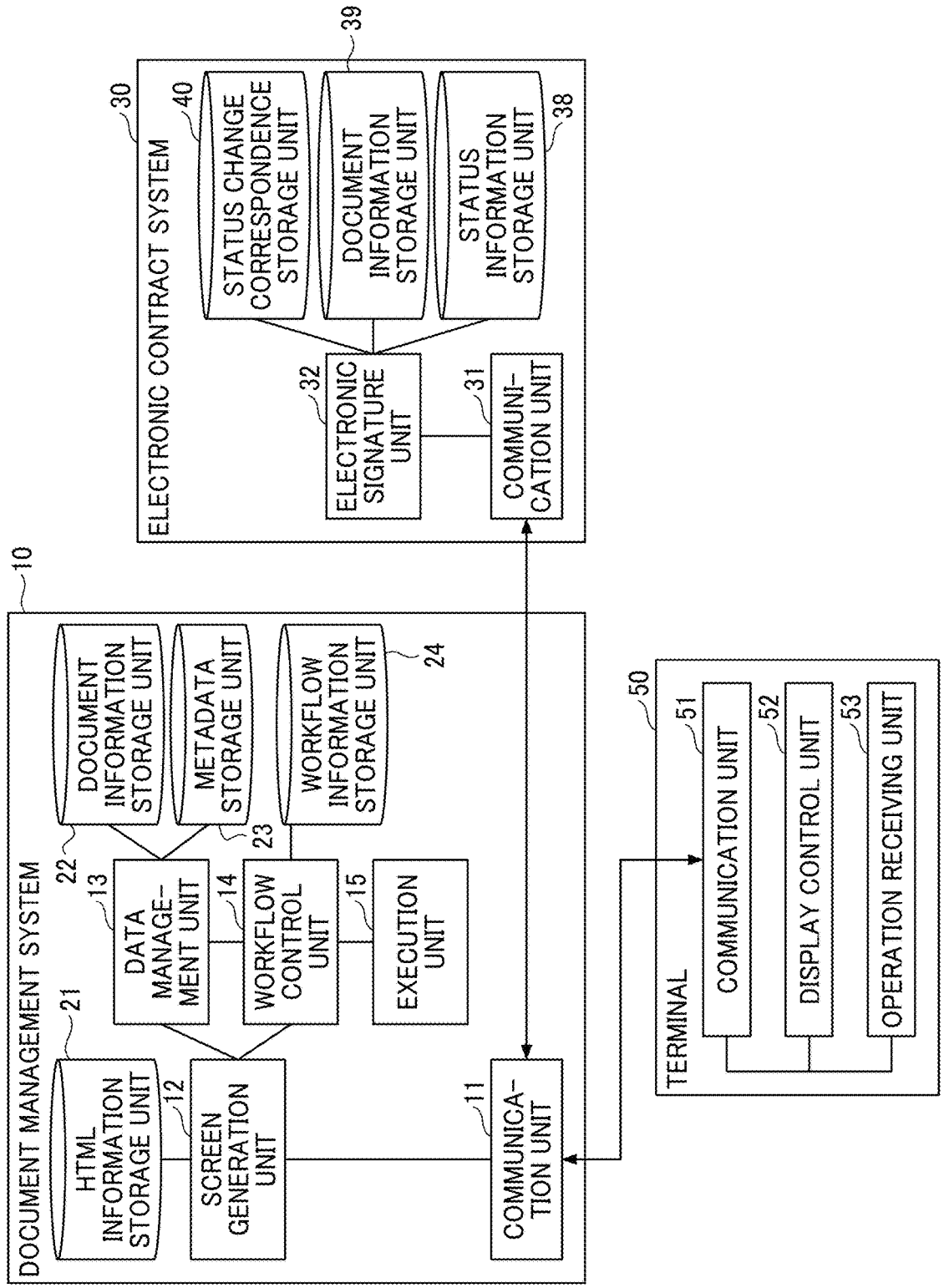
FIG. 4 is a block diagram illustrating functional configurations of the document management system, an electronic contract system, and a terminal according to one embodiment.

Next, functions of the document management system 10, the electronic contract system 30, and the terminal 50 will be described with reference to FIG. 4. FIG. 4 is a block diagram illustrating an example of functional configurations of the document management system 10, the electronic contract system 30, and the terminal 50.

Document Management System

The document management system 10 includes a communication unit 11, a screen generation unit 12, a data management unit 13, a workflow control unit 14, an execution unit 15, an HTML information storage unit 21, a document information storage unit 22, a metadata storage unit 23, and a workflow information storage unit 24. These functions of the document management system 10 are implemented by the CPU 501 of the computer 500 illustrated in FIG. 3 executing a program developed from the HD 504 to the RAM 503. The HTML information storage unit 21, the document information storage unit 22, the metadata storage unit 23, and the workflow information storage unit 24 are built in the HD 504, the RAM 503, or the like of the computer 500 illustrated in FIG. 3. The HTML information storage unit 21, the document information storage unit 22, the metadata storage unit 23, and the workflow information storage unit 24 are not necessarily included in the document management system 10 and may reside at any location on a network.

The communication unit 11 transmits and receives various kinds of information to and from the terminal 50 or the electronic contract system 30. In the present embodiment, the communication unit 11 receives a document from the terminal 50 and transmits screen information of various screens to the terminal 50. The communication unit 11 transmits a document or a request of processing to the electronic contract system 30 and receives the document processed by the electronic contract system 30 and the identification information thereof. Further, the communication unit 11 transmits a withdrawal request to the electronic contract system 30 and receives a response corresponding to the status of the document from the electronic contract system 30.

The screen generation unit 12 refers to the HTML information storage unit 21 and generates screen information of various screens (or windows) to be displayed by the terminal 50. The HTML information storage unit 21 stores templates of screens. In the templates, various tags, script language formats, and respective formats of the tags are set in advance. Tags define the arrangement of titles, characters, tables, labels, buttons, and the like to be displayed on the web page. The format defines color, size, character font, or the like of HTML documents by cascading style sheets (CSS). The format of the script language defines the content of the processing. The screen generation unit 12 generates, using the template, screen information for displaying a search screen, a document list screen, and the like, which will be described later. The screen information (screen display data) is a program described in hypertext markup language (HTML), Extensible Markup Language (XML), a script language, and cascading style sheets (CSS). The structure of web page is mainly specified by HTML, the operation of the web page is specified by the script language, and the style of the web page is specified by CSS. Note that a mechanism for dynamically generating a web page in this manner so as to realize interactive processing between a server and a client is referred to as a web application. The term "web application" refers to software (or a mechanism for such software) that is implemented by cooperation between a program defined by a programming language (for example, JAVASCRIPT) to function on a web browser and a program on a web server.

The data management unit 13 stores a document transmitted from the terminal 50 in association with metadata. The data management unit 13 stores the body (file) of the document in the document information storage unit 22 and stores the metadata in the metadata storage unit 23.

The workflow control unit 14 receives registration of a workflow, refers to the workflow information storage unit 24, monitors a start trigger, and controls generation of the execution unit 15.

The workflow information will be described later.

The execution unit 15 is a module that executes a workflow. The execution unit 15 may be referred to as a workflow itself. The execution unit 15 is an instance dynamically generated by the workflow control unit 14. The execution unit 15 automatically executes a process corresponding to the process content of the workflow. The execution unit 15 operates independently as an individual module for each document. The processing by the execution unit 15 includes assignment of a task and communication with an external system.

FIG. 5 illustrates an example of document information stored in the document information storage unit 22. The document information represents a document itself or a storage location of the document.

The document ID is identification information for uniquely identifying a document. The document ID may be a file name (if not used for another file), a file path, or a uniform resource locator (URL). The user can access the document using the document ID.

The file path represents the document itself or the storage location of the document.

FIG. 6 illustrates an example of metadata stored in the metadata storage unit 23. Metadata is data attached to a document and is useful data for controlling the document. A description is given below of each item of the metadata in FIG. 6. The metadata may be referred to as data of data.

A "document ID" is the same as the document ID in the document information storage unit 22 and is identification information for uniquely identifying a document.

A "file Name" is the name of a document.

A "document ID in electronic contract system" is identification information, used in the electronic contract system 30, of a document registered in the document management system 10. These items enable the document management system 10 to easily identify which of documents registered in the document management system 10 is processed when the document is processed by the electronic contract system 30.

A "document type" indicates what kind of processing the document is used for. When the electronic contract system 30 processes documents, many of the document types are contract-related as presented in FIG. 6, but this is merely an example.

A "contract start date" is the date from which the contract period starts when the document relates to a contract. A "contract end date" is the date on which the contract period ends. The system allows the user to change the contract start date and contract end date.

A "status" is the status of the document. Examples of status include "valid," "rejected," and "withdrawal requested."

Valid: a state in which the electronic contract system 30 is processing the contract. Rejected: a state in which the contract is rejected in the electronic contract system 30. Withdrawal Requested: a transient state from when the user makes a withdrawal request for a valid document to the electronic contract system 30 to when the document management system 10 changes the status to rejected (in some cases, withdrawal is not feasible). That is, when the user requests withdrawal of a contract or the like, such a status is temporarily set in the metadata.

These statuses are merely examples, and there may be other statuses, and the names of the statuses may be different.

The system allows the user to edit a file name, a document type, a contract start date, a contract end date, and the like on the Web page at the time of registration of the document. In other words, the user can register the metadata. Furthermore, the system allows the user to set which attribute is to be registered in the metadata storage unit 23. In other words, the user can register an item of metadata. Thus, the user can register the attribute of the document to be used for search as metadata. Therefore, the data items in the metadata storage unit 23 are not limited to those illustrated in the drawing.

Although metadata is stored for each document, there may be a document without metadata.

FIG. 7 illustrates an example of workflow information stored in the workflow information storage unit 24. The workflow information defines the content of a series of processing to be performed by the workflow. A description is given below of each item of the workflow information.

A "workflow ID" is identification information of a workflow. If there is uniqueness, the name of the workflow may be used as the identification information.

A "start trigger" is a condition under which the workflow control unit 14 generates the execution unit 15 (in other words, the execution unit 15 starts the workflow). When an event that matches the content of the start trigger occurs, the execution unit 15 automatically starts execution of the workflow. Therefore, the user does not need to explicitly specify a workflow to start execution. The start triggers in FIG. 7 are merely examples, and there may be a workflow in which the start trigger is a regularly executed workflow and a workflow in which the start trigger is registration of a file name, for example.

"Flow 1" and "Flow 2" indicate a series of processing performed by the execution unit 15 in the workflow in that order. Flow 1 is the first process, and flow 2 is the second process. Although the number of processing is two in FIG. 7, the number of processing may be any number and may be different depending on the workflow.

For example, in the workflow of ID "1," an examination process by Mr. A and an approval process by Mr. B are performed, triggered by an update of a document. In the workflow of ID "2," transmitting the document to the electronic contract system 30 is performed, triggered by storing of a new document. In the workflow of ID "3," the electronic contract system 30 is requested of withdrawal of the document, triggered by the change of the "status" in the metadata to "withdrawal requested."

Electronic Contract System

Referring again to FIG. 4, the electronic contract system 30 includes a communication unit 31, an electronic signature unit 32, a status information storage unit 38, a document information storage unit 39, and a status change correspondence storage unit 40. These functions of the electronic contract system 30 are implemented by the CPU 501 of the computer 500 illustrated in FIG. 3 executing a program stored in the HD 504. The status information storage unit 38, the document information storage unit 39, and the status change correspondence storage unit 40 are built in, for example, the HD 504 or the RAM 503 of the computer 500 illustrated in FIG. 3. The location of the status information storage unit 38, the location of the document information storage unit 39, and the location of the status change correspondence storage unit 40 are not limited to the electronic contract system 30 but may be on the network.

The communication unit 31 communicates with the terminal 50 to transmit or receive various information. In the present embodiment, the communication unit 31 receives a document from the document management system 10 and transmits the document processed by the electronic contract system 30 and the identification information thereof to the document management system 10. The communication unit 31 receives a withdrawal request of processing for a document from the document management system 10 and returns a response corresponding to the status of the document.

The electronic signature unit 32 performs a series of processing related to a contract and adds an electronic signature certifying that the contract has been completed to the document, for example. The electronic signature unit 32 stores information on the document used for the contract or the like in the document information storage unit 39 and sets the status of each document in the status information storage unit 38. The electronic signature is merely an example. For example, the second system corresponding to the electronic contract system 30 affixes a time stamp, removes noise from a document, and creates a digital watermark.

FIG. 8 illustrates an example of document information stored in the document information storage unit 39 of the electronic contract system 30. The document information represents a document itself or a storage location of the document.

The document ID is identification information for uniquely identifying a document in the electronic contract system 30. The document ID may be a file name or a file path as long as there is no overlap. The user can access the document using the document ID. Even when the document is identical, the electronic contract system 30 often assigns a document ID different from the document ID assigned by the document management system 10.

The file path represents the document itself or the storage location of the document.

FIG. 9 illustrates an example of status information stored in the status information storage unit 38 of the electronic contract system 30. The status information indicates the status of a document. The following are examples, and there may be other statuses, and the names of the statuses may be different.

Draft a status in which the electronic contract system 30 has just been uploaded the document but has not yet started agreement processing in the electronic contract system 30.

Being checked (at the other party): a status in which an agreement process on the document by the electronic contract system 30 is ongoing, and the electronic contract system 30 is waiting for the agreement of the other party (in a period from the start to the end of the contract process).

Agreed: a state in which agreement with the other party has been concluded. Rejected: a state in which processing of the document transmitted to the electronic contract system 30 is withdrawn.

FIG. 10 illustrates an example of the status change correspondence information stored in the status change correspondence storage unit 40. The status change correspondence information includes, for each current status in the electronic contract system 30, the result (response) to withdrawal request and processing in the electronic contract system 30 after notification of the result. This is because it may be difficult to withdraw the process of the document by the electronic contract system 30 or to change the status depending on the processing state (progress) of the document in the electronic contract system 30.

As illustrated in FIG. 10, there are three patterns of status "deleted," "withdrawn," and "withdrawal not feasible" as response from the electronic signature unit 32 to the withdrawal request received from the document management system 10.

Case of Draft as Status of Document in Electronic Contract System

The electronic signature unit 32 responds to the document management system 10 with "deleted." "Draft" refers to a state before agreement processing performed by the electronic contract system 30. Since the contract has been withdrawn, the document becomes unnecessary. Since there is no need to keep a history of data that is not processed on the electronic contract system 30, the status is set to "deleted." The electronic signature unit 32 deletes the document. Note that the electronic contract system 30 may change the status without deleting the document.

When the status of the document in the electronic contract system is being checked at the other party, the electronic signature unit 32 returns "withdrawn" to the document management system 10. The status "withdrawn" represents that the processing in the electronic contract system 30 has been cancelled. After the electronic contract system 30 starts the processing of a document, the document is not to be deleted to keep a history thereof even before agreement thereof. Then, the electronic signature unit 32 returns "withdrawn." The electronic signature unit 32 changes the status to "rejected." Note that the electronic contract system 30 may return "withdrawal not feasible" instead of "withdrawn."

Case of Agreed as Status of Document in Electronic Contract System

The electronic signature unit 32 responds to the document management system 10 with "withdrawal not feasible."

When an agreement has been made based on the document, the agreement cannot be withdrawn. Then, the electronic contract system 30 responds with "withdrawal not feasible." The electronic signature unit 32 does not change the status.

Case of Rejected as Status of Document in Electronic Contract System

The electronic signature unit 32 responds to the document management system 10 with "withdrawn." When the processing has been withdrawn in the electronic contract system 30 (that is, when a withdrawal request is made again), "withdrawn" is returned. The electronic signature unit 32 does not change the status.

Terminal

The terminal 50 includes a communication unit 51, a display control unit 52, and an operation receiving unit 53. These functional units are implemented by the CPU 501 illustrated in FIG. 3 executing instructions included in one or more programs installed on the terminal 50. Such program (or programs) may be a web browser or a dedicated application.

The communication unit 51 transmits and receives various kinds of information to and from the document management system 10.

In the present embodiment, the communication unit 51 receives various kinds of screen information and the like from the document management system 10 and transmits a document and contents of user input to the document management system 10.

The display control unit 52 interprets the screen information of various screens to display the contents on the display 506.

The operation receiving unit 53 receives various operations made by the user on various screens displayed on the display 506.

Procedure of Registration

Next, with reference to FIGS. 11A and 11B, a description is given of a procedure in which the document management system 10 receives registration of a document and reflects a status change in the electronic contract system 30. FIGS. 11A and 11B are sequence diagrams illustrating an example of the procedure in which the document management system 10 reflects a status change to the electronic contract system 30.

S1: When the document management system 10 is activated or when the workflow information in the workflow information storage unit 24 is updated, the workflow control unit 14 acquires the workflow information from the workflow information storage unit 24. This process may be performed by an operation of the administrator.

S2: The user operates the terminal 50 to create a contract, which is an example of a document. The format of the document file is not limited and may be a general-purpose format such as PDF or MICROSOFT WORD, or a desired application format. The document management system 10 may support the creation of the document. In this case, the terminal 50 executes a web application provided by the document management system 10 and inputs or selects characters or the like in accordance with guidance of the web application, thereby creating a desired document.

S3: The terminal 50 displays a document registration screen generated by the screen generation unit 12. The user uploads (transmits) the contract to the information processing system 100 from the document registration screen. FIG. 15A illustrates a file upload window as an example of the document registration screen. The user inputs an operation of transmitting the contract to the information processing system 100 to the terminal 50 on the document registration screen.

When the terminal 50 transmits a contract to the information processing system 100, the screen generation unit 12 generates a metadata setting screen, and the communication unit 11 transmits screen information of the metadata setting screen to the terminal 50. The communication unit 51 of the terminal 50 receives the screen information of the metadata setting screen, and the display control unit 52 displays the metadata setting screen FIG. 15B illustrates an example of the metadata setting screen. The user sets a desired metadata item and inputs a value. The operation receiving unit 53 of the terminal 50 receives the operation, and the communication unit 51 transmits the metadata to the document management system 10. The document management system 10 may extract metadata instead of transmitting metadata from the terminal 50 (or after the metadata is transmitted from the terminal 50).

S4: The communication unit 11 of the document management system 10 receives the contract and the metadata. The screen generation unit 12 requests the data management unit 13 to store the contract and the metadata.

S5: The data management unit 13 stores the contract in the document information storage unit 22. The data management unit 13 acquires the stored document ID "001" as a return value.

S6: The data management unit 13 sets "001" to the document ID of the metadata. In addition, the data management unit 13 stores a contract start date, a contract end date, and the like in the metadata storage unit 23.

FIG. 12 illustrates metadata after S6. In the description referring to FIG. 12, for simplicity, mainly differences from FIG. 6 are described. As illustrated in FIG. 12, immediately after the document is registered, the document ID, the document type, the contract start date, the contract end date, and the status "valid" are registered. Since the document is not yet transmitted to the electronic contract system 30, the contrast-system document ID is not yet acquired. The status "valid" is an initial value.

Referring again to FIG. 11A, the description is continued.

S7: The data management unit 13 notifies the workflow control unit 14 that the document specified by the document ID "001" is newly stored.

This is because the workflow control unit 14 determines whether or not the workflow start trigger is satisfied.

S8: The workflow control unit 14 sequentially refers to the start triggers in the workflow information storage unit 24 and determines whether or not one or more of the start triggers are satisfied. For the sake of explanation, it is assumed that the start trigger is satisfied. When a document or an event satisfies a plurality of workflow start triggers, the workflow control unit 14 may simultaneously generate a plurality of execution units 15 or may sequentially generate the plurality of execution units 15. The description is given below of a case where the start trigger of the workflow having the ID "2" is satisfied.

S9: When the start trigger is satisfied, the workflow control unit 14 generates the execution unit 15 for processing the document having the document ID "001." Thus, the execution unit 15 is associated with the document ID "001."

S10: In order to execute the first process (flow 1) specified by the workflow information, the execution unit 15 requests the data management unit 13 to acquire the document having the document ID "001."

S11: The data management unit 13 acquires the document having the document ID "001" from the document information storage unit 22.

S12: The data management unit 13 notifies the execution unit 15 of the document itself or the storage location of the document.

S13: Since the execution unit 15 performs a process corresponding to the workflow, the execution unit 15 transmits the acquired document to the electronic contract system 30 via the communication unit 11. The execution unit 15 requests the electronic contract system 30 to perform processing (requested processing) such as contract-related process and electronic signature adding process.

S14: The communication unit 31 of the electronic contract system 30 receives the document, and the electronic signature unit 32 stores the document in the document information storage unit 39. The electronic signature unit 32 acquires the document ID "00A" used in the electronic contract system 30 (also may be referred to as "contract-system document ID") as a return value.

S15: The communication unit 31 of the electronic contract system 30 transmits the contract-system document ID "00A" to the document management system 10.

S16: The communication unit 11 of the document management system 10 receives the contract-system document ID "00A" used in the electronic contract system 30. The execution unit 15 requests the data management unit 13 to store "00A" in the metadata of the document specified by the management-system document ID "001."

S17: The data management unit 13 stores the contract-system document ID "00A" in the metadata storage unit 23 in association with the management-system document ID "001."

FIG. 13 illustrates the metadata after step S17. In the description referring to FIG. 13, for simplicity, mainly differences from FIG. 12 are described. As illustrated in FIG. 13, "00A" is set as the identification information of the document in the electronic contract system 30.

Referring again to FIG. 11B, the description is continued.
S18: The user operates the terminal 50 to change the status of the document having been registered in the document management system 10. For example, if a user finds a mistake in a document or does not require the contract anymore, the user requests withdrawal of the processing for the document.

The terminal 50 displays the status setting screen generated by the screen generation unit 12, and the user inputs a status change request to the status setting screen. FIGS. 16 to 18 illustrate the status setting screen, a search screen displayed till the transition to the status setting screen, and the document list screen.

The operation receiving unit 53 of the terminal 50 receives a user operation, and the communication unit 51 transmits the document ID "001" and the changed status to the document management system 10. In this example, the user changes the status to "withdrawal requested."

S19: The communication unit 11 of the document management system 10 receives the status change request, and the screen generation unit 12 passes the status change request to the data management unit 13.

S20: The data management unit 13 changes the status in the metadata of the document identified by the document ID "001" to "withdrawal requested."

FIG. 14 illustrates metadata after step S20. In the description referring to FIG. 14, for simplicity, mainly differences from FIG. 13 are described. As illustrated in FIG. 14, the status of the metadata has been changed to "withdrawal requested."

Referring again to FIG. 11B, the description is continued.
S21: The data management unit 13 notifies the workflow control unit 14 of the status change (to "withdrawal requested") of the document specified by the document ID "001."

This is because the workflow control unit 14 determines whether or not the workflow start trigger is satisfied.

S22: The workflow control unit 14 sequentially refers to the start triggers in the workflow information storage unit 24 and determines whether or not one or more of the start triggers are satisfied. For the sake of explanation, it is assumed that the start trigger is satisfied. The description is given below of a case where the start trigger of the workflow having the ID "3" is satisfied.

S23: When the start trigger is satisfied, the workflow control unit 14 generates the execution unit 15 for processing the document having the document ID "001" Thus, the execution unit 15 is associated with the document ID "001."

S24: In order to execute the first process (flow 1) specified by the workflow information, the execution unit 15 requests the metadata of the document identified by the document ID "001" (the document ID "00A" in the electronic contract system 30) from the data management unit 13.

S25: The data management unit 13 acquires the document ID "00A" in the electronic contract system 30 associated with the document ID "001."

S26: The data management unit 13 notifies the execution unit 15 of the document ID "00A" in the electronic contract system 30.

S27: The execution unit 15 requests the electronic contract system 30 to acquire the status of the document specified by the document ID "00A" via the communication unit 11.

S28: The communication unit 31 of the electronic contract system 30 receives the request of acquisition of the status. The electronic signature unit 32 acquires the status of the document identified by the document ID "00A" from the status information storage unit 38.

S29: In addition, the execution unit 15 transmits the status change (withdrawal request) of the document specified by the document ID "00A" to the electronic contract system 30 via the communication unit 11.

S30: The communication unit 31 of the electronic contract system 30 receives the status change request, and the electronic signature unit 32 transmits a withdrawal request result, which is a response from the electronic contract system 30 to the request of withdrawal of the document identified by the document ID "00A."

The electronic signature unit 32 determines whether to reject withdrawal request or whether withdrawal is not feasible based on the status of the corresponding document as illustrated in FIG. 10, and notifies the document management system 10 of the result. The electronic signature unit 32 performs a process in the electronic contract system 30 as necessary. The details of the process in S30 are described with reference to FIG. 22.

S31: The communication unit 31 of the electronic contract system 30 transmits a response (deleted, withdrawn, or withdrawal not feasible) based on the status of the document to the document management system 10. The details of the process in S31 are described with reference to FIG. 20.

Examples of Screens

FIG. 15A illustrates an example of a document registration screen 250 displayed by the terminal 50. The document registration screen 250 includes a file name field 251, a browse button 252, and a save button 253. The user presses the browse button 252 to select a document saved in the HD 504 or the like. The file name of the selected document is displayed in the file name field 251. When the user presses the save button 253, the terminal 50 transmits the document specified in the file name field 251 to the document management system 10.

FIG. 15B illustrates an example of a metadata setting screen 260 displayed by the terminal 50. The metadata setting screen 260 includes a document type field 261, a contract start date field 262, and a contract end date field 263.

The document type field 261 is a field for the user to input a document type as one item of metadata.

The contract start date field 262 is a field for the user to input a contract start date as one item of metadata. The display control unit 52 may display a calendar, and the operation receiving unit 53 may receive a specific date from the user.

The contract end date field 263 is a field for the user to input a contract end date as one item of metadata. The display control unit 52 may display a calendar, and the operation receiving unit 53 may receive a specific date or a range from the user.

When the user sets the metadata and presses a confirm button 264, the terminal 50 transmits the metadata to the document management system 10.

FIG. 16 is a diagram illustrating an example of a search screen 210 displayed by the terminal 50. The user operates the terminal 50 to connect the terminal 50 to the information processing system 100. The screen generation unit 12 of the document management system 10 generates data for the search screen in response to a user operation, and the communication unit 11 transmits screen information of the search screen to the terminal 50.

The search screen 210 includes a document type field 211, a contract start date field 212, a contract end date field 213, and a search button 214.

The document type field 211 is a field for the user to input a search key for searching for the document type as an item of the metadata.

The contract start date field 212 is a field for the user to input a search key for searching for a contract start date as an item of the metadata. The display control unit 52 may display a calendar, and the operation receiving unit 53 may receive a specific date or a range from the user.

The contract end date field 213 is a field for the user to input a search key for searching for a contract end date as an item of the metadata. The display control unit 52 may display a calendar, and the operation receiving unit 53 may receive a specific date or a range from the user.

The search button 214 is a button for instructing the terminal 50 to transmit a search request (a list of documents) to the document management system 10.

Note that FIG. 16 is merely an example, and there may be an entry field for a file name and an entry field for a free keyword. There may be an entry field for a document ID. When the search button 214 is pressed, the screen transitions to a document list screen 220.

FIG. 17 is a diagram illustrating an example of the document list screen 220 displayed by the terminal 50. The document list screen 220 includes, as list items, a file name filed 221 for a document matching the search, a document type field 222, a contract start date field 223, and a contract end date field 224. That is, the document list screen 220 displays at least a part of the items of the metadata in the metadata storage unit 23 for each record (one line) that matches the search. In FIG. 17, since the type of all documents is "basic contract," it is considered that the user inputs a search key "basic contract" in the document type column on the search screen 210.

A status change button 226 is displayed for each document. When the user presses the status change button 226 corresponding to the document whose status is to be changed, the terminal 50 displays the status setting screen. Transition from the document list screen 220 to the status setting screen may be performed by the terminal 50 or the document management system 10.

When the user selects one or more documents and then presses an open button 225, the terminal 50 displays the file of the selected document(s).

FIG. 18 is a diagram illustrating an example of a status setting screen 230 displayed by the terminal 50. The status setting screen 230 includes, for example, a document type field 231, a contract start date field 232, a contract end date field 233, and a status field 234. Similar to the document list screen 220, the user can set values after change in the document type field 231, the contract start date field 232, and the contract end date field 233.

In the status field 234, the current status is displayed, and a pull-down menu is provided for the user to select one of the statuses (valid, rejected, and withdrawal requested). The user changes the status and presses a confirm button 235. As a result, the processing after step S18 is started.

Processing by Document Management System

FIG. 19 illustrates a list of processes performed by the document management system 10 and status of the document in response to the withdrawal request result (response from the electronic contract system 30 to withdrawal request). As described above with reference to FIG. 10, the withdrawal request result according to the present embodiment is one of "deleted," "withdrawn," and "withdrawal not feasible."

When the withdrawal request result is "deleted," since the file has been deleted from the electronic contract system 30, the document management system 10 also deletes the file of the document.

When the withdrawal request result is "withdrawn," the file has not been deleted from the electronic contract system 30 but the status has been changed to "rejected" as illustrated in FIG. 10. The document management system 10 changes the metadata without deleting the document. In the document management system 10, the status is changed from "withdrawal requested" to "rejected." Thus, the data management unit 13 changes the status of the electronic data to the same status as that of the electronic data in the electronic contract system 30 (another information processing apparatus).

When the withdrawal request result is "withdrawal not feasible," the status of the document in the electronic contract system 30 is not changed to "rejected." Accordingly, the metadata in the document management system 10 is changed to "valid." Therefore, in the document management system 10, the status is changed from "withdrawal requested" to "valid."

FIG. 20 is a flowchart illustrating a process performed by the document management system 10 on a document or status in response to a response (withdrawal request result) from the electronic contract system 30. Specifically, FIG. 20 illustrates the process in step S31 of FIG. 11.

The data management unit 13 determines whether or not the response from the electronic contract system 30 is "deleted" (S101).

When the determination in step S101 is Yes, the data management unit 13 deletes the document (file) identified by the document ID (S102). The data management unit 13 also deletes the metadata along with the deletion of the document.

When the determination in step S101 is No, the data management unit 13 determines whether or not the response from the electronic contract system 30 is "withdrawn" (S103).

When the determination in step S103 is Yes, the data management unit 13 changes the status of the document identified by the document ID to "rejected" (S104). In other words, the data management unit 13 sets the status of the document to "rejected" indicating that the process has been withdrawn in a case where the process by the electronic contract system 30 has started and has not yet ended (being checked at the other party).

When the determination in step S103 is No, the data management unit 13 changes the status of the document identified by the document ID to "valid" (S105).

In this way, the document management system 10 can change the status of the document according to the state of the contract in the electronic contract system 30.

Example of Display of Document

When the status in the metadata in the document management system 10 is "rejected," the document management system 10 displays the document so that the user can recognize the status.

FIG. 21 is a diagram illustrating a document list screen 240 per status, displayed on the terminal 50. In the following description with reference to FIG. 21, differences from FIG. 17 are described. In FIG. 21, the document list screen 240 includes a valid document field 241 and a rejected document field 242. A document whose status is "valid" is displayed in the valid document field 241, and a document whose status is "rejected" is displayed in the rejected document field 242. On the document list screen 240, the documents are displayed distinguishably based on the statuses of the documents.

Note that, in FIG. 21, the documents are classified into valid and rejected, but a document regarding which withdrawal is request, if any, is displayed in a manner distinguished from valid documents and rejected documents. Therefore, the user can grasp the status of the document depending on in which field the document is displayed.

Processing by Electronic Contract System in Response to Withdrawal Request

Referring to FIG. 22, a process performed by the electronic contract system 30 in response to the withdrawal request will be described. The electronic contract system 30 transmits the withdrawal request result to the document management system 10 based on the status change correspondence information illustrated in FIG. 10. Further, for example, the electronic contract system 30 deletes the document or changes the status.

FIG. 22 is a flowchart illustrating the process performed by the electronic contract system 30 in response to the withdrawal request. Specifically, FIG. 22 illustrates the process performed in S30 of FIG. 11.

The electronic signature unit 32 of the electronic contract system 30 determines whether or not the status of the document regarding which withdrawal of processing is requested is "draft" (S201).

When the status is "draft" (Yes in S201), the electronic signature unit 32 transmits "deleted" as the withdrawal request result (response) to the document management system 10 via the communication unit 31 (S202).

Further, the electronic signature unit 32 deletes, from the document information storage unit 39, the document regarding which withdrawal request is received and deletes the status of the document from the status information storage unit 38 (S203).

When the determination in step S201 is No, the electronic signature unit 32 of the electronic contract system 30 determines whether the status of the document regarding which withdrawal of processing is requested is "being checked at the other party" (S204).

When the determination in step S204 is Yes, the electronic signature unit 32 transmits "rejected" as the withdrawal request result to the document management system 10 via the communication unit 31 (S205).

In addition, the electronic signature unit 32 changes, in the status information storage unit 38, the status of the document regarding which withdrawal is requested (S206).

When the determination in step S204 is No, the electronic signature unit 32 of the electronic contract system 30 determines whether or not the status of the document regarding which withdrawal is requested is "agreed" (S207).

When the determination in step S207 is Yes, the electronic signature unit 32 transmits a withdrawal request result indicating that withdrawal is not feasible, via the communication unit 31, to the document management system 10 (S208).

When the determination in step S207 is No, the electronic signature unit 32 of the electronic contract system 30 determines whether or not the status of the document regarding which withdrawal is requested is "rejected" (S209).

When the determination in step S209 is Yes, the electronic signature unit 32 transmits "rejected" as the withdrawal request result to the document management system 10 via the communication unit 31 (S210).

In this way, the electronic contract system 30 can execute processing in accordance with the status of the document regarding which withdrawal is requested.

As described above, the document management system 10 stores association between the document ID assigned by the document management system 10 and the document ID assigned by the electronic contract system 30, so as to reflect, to the electronic contract system 30, the processing of the document requested by the user to the document management system 10. The document management system 10 performs the processing related to the document in accordance with the status of the document in the electronic contract system 30. Accordingly, the document management system 10 can process the document in conformity with the progress of the processing on the document by the electronic contract system 30.

Although embodiments of the present disclosure are described above, the present disclosure is not limited to the details of the embodiments described above, and various modifications and replacements are possible within a scope not departing from the aspects of the present disclosure. For example, elements and/or features of different illustrative embodiments may be combined with each other and/or substituted for each other within the scope of the present invention. Any one of the above-described operations may be performed in various other ways, for example, in an order different from the one described above.

For example, in the above-described embodiment, in the process of executing the workflow, the document management system 10 cooperates with the electronic contract system 30 and the document IDs are associated with each other. Alternatively, the document management system 10 may not execute the workflow. For example, the user may instruct a process to be executed by the document management system 10 and a process to be executed by the electronic contract system 30 in order.

Even when one document is transmitted from the document management system 10, a plurality of documents may be generated as a result of a process performed by the electronic contract system 30. In this case, identification information is assigned to each document generated by the electronic contract system 30.

There are various workflows. For example, one workflow includes performing optical character recognition (OCR) of a document and saving the document in a cloud storage. Another workflow includes receiving an e-mail or a facsimile and saving the e-mail or the facsimile in a cloud storage. A workflow is generated by the user setting each process performed therein.

In the above-described embodiment, the electronic contract system 30, the time stamp system, the noise removal system, and the digital watermark system are examples of the second system, but the examples include various systems such as a cloud storage system, an OCR system, translation system, and a voice recognition system.

In the above-described embodiment, by the change of the status of the document in the document management system 10, the document management system 10 receives the request of change to the processing to the electronic contract system 30. Alternatively, the document management system 10 may directly receive the request of change to the processing to the electronic contract system 30, request the electronic contract system 30 to change the processing, and execute the processing related to the document stored by the document management system 10 in accordance with a response from the electronic contract system 30.

The configuration examples illustrated in, for example. FIG. 4, functional units are divided according to the main functions for ease of understanding of the processing by the document management system 10, the electronic contract system 30, and the terminal 50. Each processing unit or each specific name of the processing unit is not to limit the scope of the present disclosure. The processes implemented by the document management system 10, the electronic contract system 30, and the terminal 50 may be divided into a larger number of processes according to the contents of processes. In addition, a single processing unit can be further divided into a plurality of processing units.

The apparatuses or devices described in one embodiment are just one example of plural computing environments that implement the one embodiment in this specification. In one embodiment, the document management system 10 includes a plurality of computing devices such as server clusters. The plurality of computing devices communicates with one another through any type of communication link including, for example, a network or a shared memory, and performs the operations described in the present disclosure.

Further, the document management system 10 may be configured to share the steps in the present embodiment illustrated in, for example, FIGS. 11A and 11B, in various combinations. The document management system 10 may be integrated into one server or may be divided into a plurality of devices or apparatuses.

Each of the functions of the described embodiments may be implemented by one or more processing circuits or circuitry. The term "processing circuit or circuitry" in the present specification includes a programmed processor to execute the functions by software, such as a processor implemented by an electronic circuit, and devices, such as an application specific integrated circuit (ASIC), a digital signal processors (DSP), a field programmable gate array (FPGA), and conventional circuit modules arranged to perform the above-described functions.

The circuitry or processing circuitry includes general purpose processors and special purpose processors. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising circuitry configured to:
    receive electronic data from a terminal, the electronic data related to an electronic contract;
    assign a first identifier to the electronic data;
    receive a second identifier assigned to the electronic data from another information processing apparatus that is separate from the information processing apparatus, the second identifier being assigned by the another information processing apparatus;
    store the first identifier in association with the second identifier;
    transmit to, via a network, the another information processing apparatus a processing request to perform processing on the electronic data;
    in a case that a withdrawal request to withdraw processing of the electronic data is received from the terminal, acquire the second identifier associated with the first identifier corresponding to the electronic data;
    transmit, to the another information processing apparatus, the withdrawal request regarding the electronic data specified by the second identifier, the processing executed by the another information processing apparatus includes processing corresponding to the electronic contract;
    receive, via the network, a response from the another information processing apparatus in response to the withdrawal request;
    execute processing related to the electronic data, the processing being different depending on a content of the response; and
    receive the processed electronic data on which the another information processing apparatus performs the processing from the another information processing apparatus after the processing executed by the another information processing apparatus is complete,
    wherein the content of the response indicates a status of the electronic data set by the another information processing apparatus, and
    the circuitry changes a status of the electronic data stored in the information processing apparatus or deletes the electronic data stored in the information processing apparatus depending on the status of the electronic data set by the another information processing apparatus indicated by the content of the response.

2. The information processing apparatus according to claim 1,
    wherein the circuitry changes the status of the electronic data set by the information processing apparatus to a same status as the status of the electronic data set by the another information processing apparatus.

3. The information processing apparatus according to claim 1,
wherein, in a case where the status of the electronic data set by the another information processing apparatus indicates that the requested processing has ended, the circuitry sets the status of the electronic data set by the information processing apparatus to valid, indicating that the requested processing is ongoing by the another information processing apparatus.

4. The information processing apparatus according to claim 1,
wherein, in a case where the status of the electronic data set by the another information processing apparatus indicates that the requested processing has not started, the circuitry deletes the electronic data stored by the information processing apparatus.

5. The information processing apparatus according to claim 4,
wherein, in a case where the response indicates deletion of the electronic data, the circuitry deletes the electronic data stored by the information processing apparatus.

6. The information processing apparatus according to claim 1,
wherein, in a case where the first status of the electronic data set by the another information processing apparatus indicates that the requested processing has started and not yet ended, the circuitry sets the status of the electronic data set by the information processing apparatus to rejected indicating that the requested processing has been withdrawn.

7. The information processing apparatus according to claim 6,
wherein, in a case where the response indicates that the requested processing on the electronic data has been withdrawn, the circuitry sets the status of the electronic data set by the information processing apparatus to rejected indicating that the requested processing has been withdrawn.

8. The information processing apparatus according to claim 1,
wherein, in a case where the response indicates that the withdrawal of the requested processing is not feasible, the circuitry sets the status of the electronic data set by the information processing apparatus to valid.

9. The information processing apparatus according to claim 1, wherein the circuitry:
receives a plurality of electronic data including the electronic data from the terminal;
in response to a request for a list of the plurality of electronic data from the terminal, generates screen information for displaying the plurality of electronic data in a manner distinguished according to a status of the electronic data set by the information processing apparatus; and
transmits the screen information to the terminal.

10. The information processing apparatus according to claim 1, wherein the circuitry:
executes a workflow of a series of processing to be executed sequentially;
determines whether a condition for starting the workflow is satisfied;
determines to execute the workflow in a case where a request of change is received from the terminal;
transmits the request of change to the another information processing apparatus in the workflow; and
executes the processing related to the electronic data in response to the response from the another information processing apparatus.

11. The information processing apparatus according to claim 1, wherein the information processing apparatus forms part of an information processing system that further includes the another information processing apparatus, and
wherein the another information processing apparatus executes another processing related to the electronic data in accordance with the status of the electronic data set by the another information processing apparatus.

12. The information processing apparatus according to claim 1, wherein the circuitry is further configured to store the first identifier in association with the second identifier as metadata.

13. The information processing apparatus according to claim 1, wherein the circuitry is further configured to transmit the electronic data to the another information processing apparatus via the network.

14. The information processing apparatus according to claim 1, wherein the information processing apparatus is a document management system and the another information processing apparatus is a contracts management system.

15. The information processing apparatus according to claim 1, wherein the network is the Internet.

16. A data processing method performed by an information processing apparatus, the method comprising:
receiving electronic data from a terminal, the electronic data related to an electronic contract;
assigning a first identifier to the electronic data;
receiving a second identifier assigned to the electronic data from another information processing apparatus that is separate from the information processing apparatus, the second identifier being assigned by the another information processing apparatus;
transmitting to, via a network, another information processing apparatus a processing request to perform processing on the electronic data, the processing executed by the another information processing apparatus includes processing corresponding to an electronic contract;
in a case that a withdrawal request to withdraw processing of the electronic data is received from the terminal, acquiring the second identifier associated with the first identifier corresponding to the electronic data;
transmitting, to the another information processing apparatus, the withdrawal request regarding the electronic data specified by the second identifier;
receiving, via the network, a response from the another information processing apparatus in response to the withdrawal request;
executing processing related to the electronic data, the processing being different depending on a content of the response; and
receiving, by the information processing apparatus, the processed electronic data on which the another information processing apparatus performs the processing from the another information processing apparatus after the processing executed by the another information processing apparatus is complete,
wherein the content of the response indicates a status of the electronic data set by the another information processing apparatus, and
a status of the electronic data stored in the information processing apparatus is changed or the electronic data stored in the information processing apparatus is deleted depending on the status of the electronic data set by the another information processing apparatus indicated by the content of the response.

17. A non-transitory recording medium storing a plurality of program codes which, when executed by one or more processors of an information processing apparatus, causes the one or more processors to perform a method, comprising:

receiving electronic data from a terminal, the electronic data related to an electronic contract;

assigning a first identifier to the electronic data;

receiving a second identifier assigned to the electronic data from another information processing apparatus that is separate from the information processing apparatus, the second identifier being assigned by the another information processing apparatus:

transmitting to, via a network, another information processing apparatus a processing request to perform processing on the electronic data, the processing executed by the another information processing apparatus includes processing corresponding to an electronic contract;

in a case that a withdrawal request to withdraw processing of the electronic data is received from the terminal, acquiring the second identifier associated with the first identifier corresponding to the electronic data;

transmitting, to the another information processing apparatus, the withdrawal request regarding the electronic data specified by the second identifier;

receiving, via the network, a response form the another information processing apparatus in response to the withdrawal request;

executing processing related to the electronic data, the processing being different depending on a content of the response; and receiving, by the information processing apparatus, the processed electronic data on which the another information processing apparatus performs the processing from the another information processing apparatus after the processing executed by the another information processing apparatus is complete, wherein the content of the response indicates a status of the electronic data set by the another information processing apparatus, and a status of the electronic data stored in the information processing apparatus is changed or the electronic data stored in the information processing apparatus is deleted depending on the status of the electronic data set by the another information processing apparatus indicated by the content of the response.

* * * * *